US006524719B1

(12) United States Patent
Yamane et al.

(10) Patent No.: US 6,524,719 B1
(45) Date of Patent: Feb. 25, 2003

(54) LAMINATE FILM AND A VAPOUR-DEPOSITED FILM EMPLOYING SAME

(75) Inventors: Nobuhisa Yamane, Kyoto (JP); Kokichi Hashimoto, Otsu (JP); Masahiro Kimura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/841,966

(22) Filed: Apr. 26, 2001

Related U.S. Application Data

(63) Continuation of application No. PCT/JP00/05691, filed on Aug. 24, 2000.

(30) Foreign Application Priority Data

Aug. 27, 1999 (JP) .......................................... 11-240851

(51) Int. Cl.[7] ......................... B32B 27/00; B32B 27/06; B32B 27/34; B32B 27/36

(52) U.S. Cl. ................................ 428/474.7; 428/474.4; 428/411.1; 428/474.9; 428/475.2; 428/475.5; 428/477.7; 428/480

(58) Field of Search ........................... 428/474.7, 474.4, 428/411.1

(56) References Cited

U.S. PATENT DOCUMENTS

| | | | | |
|---|---|---|---|---|
| 5,955,180 A | * | 9/1999 | Harada et al. | 428/212 |
| 6,376,093 B1 | * | 4/2002 | Fujita et al. | 428/474.4 |

FOREIGN PATENT DOCUMENTS

| | | | |
|---|---|---|---|
| EP | 0 460 796 A2 | | 12/1991 |
| EP | 0 527 237 A1 | | 2/1993 |
| EP | 0 806 448 A2 | | 11/1997 |
| EP | 0 960 903 A2 | | 12/1999 |
| JP | 6-240134 A | | 8/1994 |
| JP | 07-223305 | * | 8/1995 |
| JP | 09-174777 | * | 7/1997 |
| JP | 10-29264 A | | 2/1998 |
| JP | 2000-238219 A | | 9/2000 |

OTHER PUBLICATIONS

Patent Abstract of Japan, Publication No. 4–270655, Publication Date Sep. 28, 1992.

Database WPI, Section Ch, Week 199814, Derwent Publications Ltd., London, GB; Class A23, AN 1998–153329, XP002191222; JP 10–024489 A (Unitika Ltd), Jan. 27, 1998.

Database WPI, Section Ch, Week 198929, Derwent Publications Ltd., London, GB; Class A23, AN 1989–206927, XP002191223; AU 25700 88 A (Transpak Inds Ltd), May 25, 1989.

Database WPI, Section Ch, Week 200055, Derwent Publications Ltd., London, GB; Class A23, AN 2000–581949, XP002191224; JP 2000–202968 A (Toyobo KK), Jul. 25, 2000.

Database WPI, Section Ch, Week 199528, Derwent Publications Ltd., London, GB; Class A23, AN 1995–212235, XP 002191225; JP 07–125132 A (Idemitsu Petrochem Co), May 16, 1995.

Patent Abstract of Japan, Publication No. 11–048393, Publication Date Feb. 23, 1999.

* cited by examiner

*Primary Examiner*—P. Hampton-Hightower
(74) *Attorney, Agent, or Firm*—Kubovcik & Kubovcik

(57) ABSTRACT

The present invention relates to a laminate film where on at least one face of a substrate layer selected from polyester film and aliphatic polyamide film, there is provided a polyamide layer in which the chief component is an aromatic polyamide of glass transition temperature at least 60° C., as a layer to undergo vapour deposition, and (1) the centre-line average roughness (Ra) of the face which is to undergo vapour deposition is in the range 0.005 to 0.03 $\mu$m, or (2) between the substrate layer and the polyamide layer, a layer comprising a single polymer or a plurality of polymers of SP value 10 to 15 is interposed between the substrate A layer and the polyamide C layer; and the invention offers film for vapour-deposition which is outstanding in its processability in vapour-deposition, and in its gas barrier properties.

21 Claims, No Drawings

LAMINATE FILM AND A VAPOUR-DEPOSITED FILM EMPLOYING SAME

This application is a continuation of international application number PCT/JP00/05691, filed Aug. 24, 2000.

TECHNICAL FIELD

The present invention relates to a laminate film which is outstanding in its oxygen and water vapour barrier properties, and to a vapour-deposited film employing same.

TECHNICAL BACKGROUND

For the purposes of storing foods and pharmaceutical products over a long period of time, it is necessary to carry out packaging which is outstanding in its gas barrier properties, that is to say which has the effect of preventing penetration from outside of the oxygen and water vapour which accelerate deterioration and putrefaction. In recent years, there has been an increasing demand that the film packaging with outstanding gas barrier properties used for this purpose be transparent in order to enable, in particular, the state of the contents to be ascertained.

Now, as an example of non-transparent packaging which possesses high-level gas barrier properties, there is known film packaging where aluminium foil has been laminated but, when compared to polymer film, aluminium foil has poor flexing characteristics and pinholes are produced by, for example, folding-over during processing and the like, so the gas barrier properties are easily impaired, and hence there is desired a replacement film having high-level gas barrier properties matching aluminium foil.

As examples of transparent gas barrier films, there are known those where polyvinylidene chloride or ethylene/vinyl alcohol copolymer is laminated. Moreover, it is already well-known that where metal compounds are formed on a polymer film the gas barrier properties and transparency are good.

However, conventional transparent gas barrier films have problems of the following kind. Polyvinylidene chloride resin or ethylene/vinyl alcohol copolymer resin laminate films are inadequate in their oxygen and water vapour gas barrier properties and, in particular, there is a marked lowering thereof in high temperature sterilization treatments. Furthermore, when incinerated, polyvinylidene chloride produces chlorine gas and there are concerns about its effects on the terrestrial environment.

On the other hand, film where a coating of silicon oxide or aluminium oxide has been formed by vapour-deposition has excellent barrier properties but, in recent years, as eating habits have become more sophisticated, and along with the appearance of various different kinds of food products and cakes/confectionary on the market, the enhancement of properties such as the barrier properties and the prolonged maintenance of product quality have come to be regarded as even more important. In particular, in the packaging of snack confectionary and foods, gas barrier properties which exceed those achieved hitherto have begun to be demanded to prevent oxidation or dampening of the contents, and in order to ensure fresh quality over a long period.

In order to meet such requirements, for example in JP-A-10-29264 there is described the provision of an inorganic vapour-deposited layer on a polyamide film; in JP-A-7-223305 there is described a polyester/aromatic polyamide laminate film; and in JP-A-9-174777 there is described the provision an inorganic vapour-deposited layer on the polyester side of a polyamide/modified-polyester laminate film. While the gas barrier properties are certainly improved thereby, they do not achieve the high levels recently demanded.

Consequently, the objective of the present invention lies in overcoming the problems of the prior art and, with the aim of markedly enhancing the gas barrier properties in respect of oxygen and water vapour of vapour-deposition film, offering a film for vapour deposition which is made to manifest outstanding gas barrier properties; together with a vapour-deposited film employing same.

DISCLOSURE OF THE INVENTION

The present invention relates to a laminate film where a polyester film or an aliphatic polyamide film is employed as a substrate layer (the A layer), and where a polyamide layer (the C layer) in which the chief component is an aromatic polyamide of glass transition temperature at least 60° C. is employed as a layer to undergo vapour deposition, and the centre-line average roughness (Ra) of the face which is to undergo vapour deposition is in the range 0.005 to 0.03 $\mu$m. Furthermore, the present invention relates to a laminate film where a polyester film or an aliphatic polyamide film is employed as a substrate layer (the A layer), and where a polyamide layer (the C layer) in which the chief component is an aromatic polyamide of glass transition temperature at least 60° C. is employed as a layer to undergo vapour deposition, and between the A layer and the C layer there is interposed a layer (the B layer) comprising polymer of SP value 10 to 15. Moreover, the present invention also relates to a packaging film where an inorganic thin film has been vapour-deposited on the vapour-deposition face of said laminate film.

Optimum Form for Practising the Invention

Polyester film in the present invention refers to a polymer film comprising a dicarboxylic acid component and a glycol component. Examples of the dicarboxylic acid component are isophthalic acid, terephthalic acid, phenyl-4,4'-dicarboxylic acid, 2,6-naphthalenedicarboxylic acid, naphthalene-2,7-dicarboxylic acid, naphthalene-1,5-dicarboxylic acid, diphenoxyethane-4, 4'-dicarboxylic acid, diphenylsulphone-4,4'-dicarboxylic acid, diphenylether-4, 4'-dicarboxylic acid, malonic acid, 1,1-dimethylmalonic acid, succinic acid, glutaric acid, adipic acid, sebacic acid, decamethylenedicarboxylic acid and the like but, amongst these dicarboxylic acid components, film comprising an acid component in which the chief component is terephthalic acid and/or 2,6-naphthalenedicarboxylic acid, is preferred. If the chief component is other than terephthalic acid or 2,6-naphthalenedicarboxylic acid, the adhesive strength of the vapour-deposited film tends to be inferior and it may be difficult to obtain outstanding gas barrier properties.

On the other hand, examples of the glycol component are glycol components such as ethylene glycol, tetramethylene glycol, hexamethylene glycol, neopentyl glycol, 1,3-propanediol and other such aliphatic glycols, cyclohexanedimethanol and other such alicyclic glycols, and bisphenol A, bisphenol S and other such aromatic glycols, and also polyethylene glycol, polypropylene glycol, polytetramethylene glycol, and copolymer materials such as polyethylene glycol/propylene glycol copolymer but, of these, a glycol component in which ethylene glycol is the chief component is preferred. With other than ethylene glycol as the chief component, the adhesive strength of the vapour-deposited film tends to be inferior and it may be difficult to obtain outstanding gas barrier properties. Now, there may be jointly used two or more such dicarboxylic acid components and/or glycol components.

Other polyesters can be incorporated into the polyester film within a range such that the effects of the invention are not impaired. Examples of such other polyesters are polyethylene terephthalate (PET), polypropylene terephthalate (PPT), polybutylene terephthalate (PBT), polyhexamethylene terephthalate (PHT), polyethylene naphthalate (PEN), polycyclohexane-dimethylene terephthalate (PCT), polyhydroxybenzoate (PHB) and copolymer resins thereof.

Furthermore, aliphatic polyamide film in the present invention refers to a polyamide film obtained by the ring opening polymerization of a lactam, the polycondensation of an aminocarboxylic acid or the polycondensation of a diamine and dicarboxylic acid. Specific examples are polyamide 6, polyamide 12, polyamide 11, polyamide 6-6, polyamide 6-10, polyamide 6-12 and copolymers or mixtures thereof.

The film of the present invention needs to have a substrate layer selected from polyester films and aliphatic polyamide films and, in terms of the vapour-deposition processability, a polyester film is preferred.

The aromatic polyamide in the present invention is a polyamide in which at least 85 mol % of the amide bonds are obtained from a aromatic diamine and/or an aromatic dicarboxylic acid component. Specific examples thereof are poly-p-phenylene terephthalamide, poly-m-phenylene terephthalamide, poly-p-benzamide, poly-4,4'-diaminobenzamide, poly-p-phenylene-2,6-naphthalicamide, copoly-p-phenylene/4,4'-(3,3'-dimethylbiphenylene)-terephthalamide, copoly-p-phenylene/2,5-pyridylene-terephthalamide, poly-o-phenylene naphthalamide, poly-m-phenylene phthalamide, poly-p-phenylene phthalamide, poly-o-phenylene isophthalamide, poly-m-phenylene isophthalamide, poly-p-phenylene isophthalamide, poly-o-phenylene terephthalamide, poly-1,5'-naphthalene phthalamide, poly-4,4'-diphenylene-o-phthalamide, poly-1,4-naphthalene phthalamide, poly-1,4-naphthalene isophthalamide, poly-1,5-naphthalene isophthalamide, and aromatic amides containing alicyclic amines typified by those where some of the benzene rings of the aromatic diamines in the aforesaid polymers are replaced by piperazine, 1,5-dimethylpiperazine or 2,5-diethylpiperazine, or aromatic polyamide copolymers containing two phenylene groups which are linked by means of an ether linkage, for example when the aromatic diamine is 3,3'-oxydiphenylenediamine or 3,4'-oxydiphenylenediamine, or by —S—, —$SO_2$—, —CO—, —NH— or the like, examples of which are poly-3,3'-oxyphenyleneterephthalamide/poly-p-phenylene terephthalamide copolymer, poly-3,4'-oxydiphenylene terephthalamide/poly-p-phenylene terephthalamide copolymer and the like.

It is necessary that there be laminated to at least one face of the substrate layer selected from polyester film and aliphatic polyamide film, a polyamide C in which the chief component is, from amongst the aforesaid aromatic polyamides, an aromatic polyamide of glass transition temperature at least 60° C. If the glass transition temperature is less than 60° C., it is difficult to obtain outstanding barrier properties of the vapour-deposited film, so this is undesirable. More preferably, the glass transition temperature is at least 80° C. and still more preferably at least 100° C. The upper limit of glass transition temperature in the case of aromatic polyamides is about 120° C., and so the substantial upper limit of glass transition temperature is 120° C.

The laminated thickness of the C layer is preferably in the range 0.01 to 5 μm. With less than 0.01 μm, it is difficult to obtain outstanding vapour-deposited barrier properties, so this is undesirable. Conversely, if the laminated thickness exceeds 5 μm then, depending on the thickness of the substrate layer, curling of the film tends to occur and handling is impaired, so this is undesirable. More preferably, the laminated thickness is 0.05 to 5 μm and still more preferably it is 0.1 to 5 μm.

In the film of the present invention, it is preferred that a B layer comprising a single polymer, or a plurality of polymers, of SP value (solubility parameter) 10 to 15 be interposed between the substrate layer, that is to say the A layer comprising polyester film or aliphatic polyamide film, and the polyamide C layer. In the case where the A layer is an aliphatic polyamide film, then there need not necessarily be interposed a polymer B layer, but in the case where the A layer is a polyester film, if no polymer B layer is interposed, problems such as layer separation tend to arise, so it is preferred that a B layer be interposed.

Here, SP values (solubility parameters) are numbers which denote the compatibility of compounds, and the SP value can be determined by a measurement means such as the latent heat of evaporation method, the vapour pressure method, the dissolution method, the swelling method, the surface tension method, the critical pressure method or the thermal expansion coefficient method, or by calculation based on the molecular attraction constant method using the molecular attraction constants proposed by Small, Hoy et al (Hoy K L, J. Paint Technol. 42(541)76-(1970), Small Pa., J. Appl. Chem. 3, 71-(1953)).

In the film of the present invention, the polymer B layer is preferably composed of a polyester D and a polyamide E. As polyester D, there may be used a polyester of the same kind as described above, or there can be used another polyester. As polyamide E, there may be used an aforesaid aliphatic polyamide or aromatic polyamide, or a mixture of the two, but, in terms of the adhesion properties, it is preferred than an aromatic polyamide be used. In terms of the adhesion properties, the compositional ratio (weight ratio) of polyester D/polyamide E in the polymer B layer is preferably from 90/10 to 10/90.

The laminated thickness of the polymer B layer is not particularly restricted but, from the point of view of the adhesion properties, 0.1 to 10 μm is preferred and 0.2 to 5 μm is more preferred.

The lamination method is not particularly restricted and examples include the method of lamination by coating and the method of lamination by co-extrusion, with the method based on co-extrusion being particularly preferred in terms of the adhesion properties of the respective layers, and the oxygen and water vapour barrier properties.

In the case of the film of the present invention, it is preferred that the centre-line average roughness (Ra) of at least one face of the polyamide C layer be 0.005 to 0.03 μm. More preferably, it is 0.008 to 0.025 μm, and still more preferably 0.01 to 0.02. If Ra is less than 0.005 μm, the film handling characteristics tend to be impaired, so this is undesirable. If Ra exceeds 0.03 μm, then as well as the resistance to scratching being impaired, pin holes are readily produced at the time of the vapour-deposition, so this is undesirable. There are no restrictions on the method for ensuring Ra lies within the aforesaid range, but the method of incorporating particles into the substrate layer is preferred, and there may also be used the method of using a metal drum with a textured surface to transfer the texture at the drum surface to the film.

The film of the present invention preferably has a substrate layer planar orientation coefficient ($f_n$) lying in the range 0.155 to 0.180, and more preferably in the range 0.1625 to 0.175. If $f_n$ is less than 0.155 then, since the film orientation is lowered, there is a lowering of strength and the film is readily stretched by external forces, and the processing suitability tends to be reduced, so this is undesirable. Conversely, if it exceeds 0.180, film widthwise-direction variation in properties and whitening readily occur, so this is undesirable.

The film of the present invention will preferably have a percentage heat shrinkage, measured at 150° C. for 30 minutes, of 0.5 to 2% in the film lengthwise direction and −1.2 to 0.5% in the widthwise direction, and more preferably 1 to 2% in the film lengthwise direction and −1 to 0% in the widthwise direction. In the case where the heat shrinkage exceeds 2% in the film lengthwise direction or exceeds 0.5% in the widthwise direction, or again if the film extends more than 1.2% in the widthwise direction, dimensional changes readily occur at the time of vapour-deposition, or during processing when an external force is applied such as during lamination or printing, so this is undesirable. It is preferred that the lengthwise direction heat shrinkage at 150° C. for 30 minutes be as small as possible but, since there is an inevitable 0.5% lengthwise shrinkage, the lower limit of heat shrinkage in the lengthwise direction is essentially 0.5%. Now, a minus (−) value of heat shrinkage here denotes elongation.

In the present invention, the difference in Ra between that of the face which is to undergo vapour-deposition and that of the face which is not to undergo vapour-deposition (ΔRa) is preferably in the range 0.003 to 0.045 μm. It is further preferred that ΔRa be 0.005 to 0.045 μm. Ra for the face which is not subjected to vapour-deposition is preferably 0.008 to 0.05 μm, and more preferably 0.01 to 0.03 μm. If Ra for the face not subjected to vapour deposition exceeds 0.05 μm, the slipperiness is too great, and instead the vapour-deposition characteristics and processability are impaired, for example the handling properties are adversely affected, so this is undesirable.

The particles added to the film of the present invention are not particularly restricted providing they are inactive in terms of the polyester but, as examples of the added particles, there are inorganic particles, organic particles, crosslinked polymer particles and particles which are internally-produced within the polymerization system. Two or more types of such particles may be added. The amount added is preferably from 0.01 to 10 wt % and more preferably from 0.02 to 1 wt %. The average size of the particles added is preferably 0.001 to 10 μm and more preferably 0.01 to 2 μm. If the average particle size exceeds 10 μm, film defects tend to be produced, which is undesirable.

The inorganic particles used are not particularly restricted and examples include calcium carbonate, kaolin, talc, magnesium carbonate, barium carbonate, calcium sulphate, barium sulphate, lithium phosphate, calcium phosphate, magnesium phosphate, aluminium oxide, silicon oxide, titanium oxide, zirconium oxide, lithium fluoride and the like.

Examples of the organic particles are calcium oxalate, and the terephthalic acid salts of calcium, barium, zinc, manganese, magnesium and the like.

Examples of the crosslinked polymer particles are the homopolymers or copolymers of vinyl monomers such as divinyl benzene, styrene, acrylic acid and methacrylic acid. Furthermore, organic fine polymer particles of polytetrafluoroethylene, benzoguanamine resins, thermosetting epoxy resins, unsaturated polyester resins, thermosetting urea resins, thermosetting phenolic resins and the like are also favourably employed.

As particles internally-produced within the polymerization system, there can be used those produced by the known method of adding an alkali metal compound or alkaline earth metal compound to the reaction system, and also by further adding a phosphorous compound.

Optionally, in the film of the present invention, there can be incorporated flame retardants, heat stabilizers, antioxidants, UV absorbers, antistatic agents, pigments, dyes, fatty acid esters, waxes or other organic lubricants, or antifoaming agents such as a polysiloxane.

The thickness of the film of the present invention is not particularly restricted but it is preferably 1 to 3.00 μm and more preferably 5 to 100 μm.

The film structure may be a two-layer laminate of A/C, a three-layer laminate of A/B/C or a multi-layer laminate with more than three layers, and the lamination thickness ratio may be freely set. Furthermore, there may also be laminated layers other than these, for example an antistatic layer, a matt layer, a hard coat layer, a ready-slip coating layer, a ready-adhesion layer, a tacky adhesion layer or the like.

In the case of the film for vapour-deposition of the present invention, by subjecting the surface of the polyamide C layer which is to undergo vapour-deposition to a corona discharge treatment and raising the surface wetting tension to at least 35 mN/m, the adhesion of the vapour-deposited inorganic thin film is enhanced, so this is preferably employed. The gas atmosphere at the time of the corona discharge treatment may be air, carbon dioxide or a mixed nitrogen/carbon dioxide system, and when, in particular, the corona treatment is carried out in carbon dioxide gas or in a mixed nitrogen/carbon dioxide gas (volume ratio in the range from 95/5 to 50/50) ,the surface wetting tension of the film is raised to 35 mN/m or above, so this is preferred.

As the inorganic thin film there can be favourably used an aluminium thin film and/or an oxide of a metal such as aluminium, silicon, zinc, magnesium or the like. Amongst the metal oxides, the use of an aluminium oxide thin film is further preferred from the point of view of gas barrier properties and cost. The metal oxide may be just one of the aforesaid oxides or it may be a mixture thereof, and some metal component may also remain.

Ordinary vacuum deposition can be employed as the method for forming these inorganic thin films by vapour-deposition but there can also be used methods such as ion plating or sputtering, or activation of an evaporated material with a plasma. With regard to the method of forming a metal oxide, there may be favourably employed, from the point of view of productivity, the method of building-up the metal oxide by direct evaporation of a metal oxide, or by reactive vapour-deposition in an oxidizing atmosphere. Again, chemical gas phase vapour deposition methods (so-called CVD methods) can be used as vapour deposition methods in the broad sense. An oxidizing atmosphere refers to the introduction into the vacuum deposition device, in the required amount, of oxygen gas by itself or oxygen gas diluted with an inert gas. An inert gas denotes a rare gas such as for example argon or helium, or nitrogen gas, or mixtures thereof. Reactive vapour deposition is a technique in which evaporation is effected from a metal or metal oxide in an oxidizing atmosphere, and an oxidation reaction brought about in the vicinity of the substrate layer so that formation is effected on the substrate layer. The evaporation source for such purposes may have a boat form of resistance heating system or a crucible form based on radiant or high frequency heating, or there may be used a system based on electron beam heating, but there are no particular restrictions thereon.

In the case where the inorganic thin film is a metal oxide, it is most preferred that it be totally the oxide but, generally speaking, when trying to totally form the oxide there is a high likelihood of producing regions which are over-oxidized and where the gas barrier properties are inferior such that it is difficult to obtain high overall gas barrier performance. Hence, the inorganic thin film may be an incompletely-oxidized film in which some metal component remains. Where used as a packaging bag, the light transmittance of the vapour-deposited film is preferably at least 70%, more preferably at least 80% and still more preferably at least 85%, from the point of view of being able to confirm the quality of the contents. The upper limit of light transmittance is restricted by the light transmittance of the polyester film in the present invention, and since the upper limit of the light transmittance of such film is 92%, the essential upper limit of light transmittance is 92%.

With regard to the thickness of the inorganic thin film, in the case of an aluminium thin film there is used a thickness of 20 to 50 nm and, by optical density (the logarithm of the reciprocal of the light transmittance) there is deposited material giving a value of 1.5 to 3 approximately. In the case of a metal oxide, from the point of view of the gas barrier properties and flexibility, there is preferably used a thickness in the range S to 100 nm and more preferably 8 to 50 nm. With less than 5 nm, the barrier properties are inadequate, while if the film thickness exceeds 100 nm, as a result of the latent heat of condensation of the metal oxide at the time of vapour-deposition there occurs thermal damage where the outermost surface of the film melts and whitens, and the flexibility of the vapour-deposited film deteriorates. Furthermore, if the film is folded-over or the like, splitting or peeling of the vapour-deposited film readily occurs. Hence, this is undesirable.

It is possible to provide a layer of other resin on the inorganic thin-film vapour-deposited face of the vapour-deposited film. As said other resin, a film comprising for example a polyolefin resin, nylon resin or polyethylene terephthalate film is preferred, and said film may be biaxially-drawn or undrawn. In the case of lamination to provide a heat-seal layer, an undrawn film of polyolefin resin is preferred, and it is desirable that such film be laminated by the extrusion-lamination method or by means of an adhesive agent. Such vapour-deposited film is used as a packaging bag by superimposing heat-seal layers, and then sealing.

The film of the present invention can be produced using any conventionally-known method. For example, in the case of biaxially-drawn film, the polymers which constitute polyester A, polymer B and polyamide C are dried using an ordinary hopper dryer, paddle dryer, vacuum dryer or the like, after which they are respectively supplied to separate extruders and melt extruded at 200–320° C. via a slit-shaped three-layer die, and rapidly cooled, to produce an undrawn laminate film of polyester A/polymer B/polyamide C. In the case where the T-die method is used, by employing the so-called electrostatic pinning method at the time of the rapid cooling it is possible to obtain a film of uniform thickness, and this is preferred. Next, methods for simultaneously or sequentially biaxially-drawing the undrawn film are described. In the case of sequential biaxial drawing, the order of drawing may be in the film lengthwise direction and then the widthwise direction, or the reverse. Furthermore, in sequential biaxial drawing, the lengthwise direction or widthwise direction drawing can be carried out twice or more. The method of drawing is not particularly restricted, and there may be used methods such as roll drawing or stenter drawing, and the formed film shape may be flat, tubular or the like. The lengthwise direction and widthwise direction draw ratios can be freely set according to the desired orientation and suitability for vapour-deposition but they are preferably in the range 1.5 to 6.0. The drawing temperature may be any temperature lying in the range between the glass transition temperature of the polyester and the crystallization temperature but, normally, from 30 to 150° C. is preferred. Furthermore, following the biaxial drawing, heat treatment of the film can be carried out. The heat treatment temperature can be any temperature below the melting point of polyester A but, preferably, it is in the range from 200 to 240° C. The heat -treatment may be carried out while allowing the film to relax in the lengthwise direction and/or the widthwise direction.

Next, before the vapour-deposition, the surface (polyamide C layer) of the film of the present invention which is to undergo vapour deposition may be given a known treatment to promote adhesion, for example it may be subjected to a corona discharge treatment in air or in some other kind of atmosphere, or to a flame treatment or a UV treatment. In the case of a corona discharge treatment, the gas atmosphere may be air, carbon dioxide or a mixed system of nitrogen/carbon dioxide and, in particular, when the corona treatment is carried out in carbon dioxide or a nitrogen/carbon dioxide mixed gas (volume ratio in the range 95/5 to 50/50), the surface wetting tension of the film surface will be at least 35 mN/m, so this is preferred.

Next, the film of the present invention is set in a vacuum deposition device equipped with a film travel device, and said film is made to travel via a cooling metal drum. While so-doing, aluminium metal is heated and caused to evaporate, and vapour-deposition is carried out. Alternatively, oxygen gas is supplied to the location of evaporation/vaporization and, while oxidizing the aluminium, condensation and deposition take place on the travelling film, forming an aluminium oxide vapour-deposited layer, and the film is then wound up. By varying the ratio of the amount of aluminium. evaporated at this time and the amount of oxygen gas supplied, it is possible to vary the light transmittance of the aluminium oxide vapour-deposited film. Following the vapour-deposition, the interior of the vacuum deposition device is returned to normal pressure and the wound film is slit. When ageing is carried out by leaving for at least one day at a temperature of at least 30° C., the gas barrier is properties are stabilized, so this is preferred.

EXAMPLES

Next, the effects of the present invention are explained by means of examples, but the present invention is not to be restricted to these examples. Firstly, the methods of measuring the properties and the evaluation methods are given.

Methods of Properties Measurement and Evaluation

The values of the properties in the present invention are based on the following methods of measurement.

(1) Glass Transition Temperature (Tg)

Using a thermal analysis device, model DSC II made by Seiko Instruments Ltd, a 5 mg sample was held for 5 minutes at 300° C. and then quenched using liquid nitrogen, after which the sample was heated-up at a rate of 20° C./minute. The centre temperature at the point of transition was taken as the glass transition temperature (Tg).

(2) Melting Point (Tm)

Using a thermal analysis device, model DSC II made by Seiko Instruments Ltd, a 5 mg sample was heated from room temperature at a rate of 20° C./minute, and the peak temperature of the melting endotherm was taken as the melting point (Tm).

(3) Intrinsic Viscosity

This was measured at 25° C., with the polyester dissolved in o-chlorophenol.

(4) Relative Viscosity ($\eta_r$)

This was measured in accordance with the polyamide test method (the formic acid solution method) in JIS K-6810.

(5) Planar Orientation Coefficient $f_n$

Using an Atago (Ltd) Abbe refractomer, and employing a sodium lamp as the light source, measurement of the refractive index of the film was carried out. The refractive index $n_\gamma$ in the lengthwise direction within the film plane, the refractive index $n_\beta$ in the widthwise direction perpendicular thereto and the refractive index $n_\alpha$ in the thickness direction were determined, and then the planar orientation coefficient $f_n$ obtained from the following formula.

$$f_n=(n_\gamma+n_\beta)/2-n_\alpha$$

(6) Average Particle Diameter

Resin was eliminated from the film by a plasma low-temperature ashing treatment method and the particles exposed. Treatment conditions were selected such that ashing of the resin was effected without subjecting the particles to damage. 5,000–10,000 particles were observed under a scanning microscope and, by subjecting the image of the particles to an image analyser, the average particle size was determined from the diameter of the equivalent circle. In the case where the particles were internally-generated particles, a polymer section was cut and an ultra-thin slice of thickness about 0.1 to 1 μm prepared. Using a transmission electron microscope, photographs were taken (ten: 25 cm×25 cm) at a magnification of about 5,000 to 20,000 and the average particle size of the internally-generated particles calculated from the diameter of the equivalent circle.

(7) Centre-line Average Roughness (Ra)

The surface roughness was measured using a high precision, thin film, level difference measurement instrument ET-10 made by the Kosaka Kenkyujo. The conditions were as given below, and the average value of 20 measurements was taken as the centre-line average roughness (Ra).

| | |
|---|---|
| tip radius of tracer: | 0.5 μm |
| tracer load: | 5 mg |
| measurement length | 1 mm |
| cut-off: | 0.08 mm |

Now, the definitions of Ra and Rt are given in, for example, "Surface Roughness Measurement and Evaluation Methods" by J. Nara (Ed.), published by the Sogo Centre, 1983.

(8) Heat Shrinkage

Reference lines were provided on a film sample 200 mm apart, then the film cut to 10 mm and the film sample suspended in the lengthwise direction. A 1 g load was added in the lengthwise direction and the sample heated from 30 minutes using hot air at 150° C., after which the length between the reference lines was measured, and the percentage shrinkage (%) obtained from the ratio of the extent of film shrinkage divided by the original dimension. Where the film increased in length, this was shown by a minus (−).

(9) Optical Density (OD)

In accordance with JIS K-7605, using a Macbeth transmission densitometer TR927, the transmission density of the vapour-deposited film was measured with the filter set to 'Visual', and this was taken as the optical density.

(10) Light Transmission

Using a model 324 spectrophotometer made by Hitachi Ltd, the transmittance of the vapour-deposited film was determined at a wavelength of 550 nm.

(11) Gas Barrier Properties

A. Water-vapour transmission (moisture barrier property)

Using a "Permatran" W3/31 water vapour transmission meter made by the Modern Control Co., the value measured under conditions of temperature=37.8° C. and relative humidity=100% was expressed in units of g/m$^2$·day.

B. Oxygen transmission

Using an "Oxtran"−100 oxygen transmission meter made by the Modern Control Co., the value measured under conditions of temperature=23° C. and relative humidity=80% was expressed in units of ml/m$^2$·day·MPa.

(12) Film Thickness Structure and Thickness of the Inorganic Thin Film Layer

The film cross-section was photographed under the following conditions using a transmission electron microscope (TEM), and the film thickness structure and thickness of the inorganic thin film layer were measured.

| | |
|---|---|
| instrument: | JEM-1200EX made by JEOL |
| magnification: | film thickness structure = 1000x<br>thickness of inorganic thin film layer = 400,000x |
| accelerated electrons: | 100 kV |

(13) Adhesion of the Vapour-deposited Film

Undrawn propylene film (CPP) (3529T produced by Toray Plastic Films Co. Ltd, 25 μm) was affixed to the vapour-deposited face of the vapour-deposited film using a polyurethane adhesive and, after ageing for 48 hours at 40° C., the film was cut to a 15 mm width and, using a Tensilon, 180° peeling between the CCP and the vapour-deposited inorganic thin film was carried out at a peeling rate of 100 mm/minute. With regard to the peeling, this was measured dry (25° C., under a 50% RH atmosphere) and the water-resistant adhesion measured (peeling with water dropped onto the peeling interface). Evaluation of the vapour-deposited adhesion was performed, taking both of dry and wet values of 2 N/cm or more as O, both values of dry and wet less than 1 N/cm as X, and values in-between as Δ.

(14) Handling Properties

The handling properties (slipperiness and the like) of the film at the time of vapour-deposition and processing were evaluated, with outstanding handling taken as O and poor handling taken as X.

Next, the method of producing the film of the present invention is explained by providing examples where the lamination is performed in the order film/surface treatment/inorganic thin film but the invention is not of course to be restricted to such examples.

The effects of the invention are now explained by means of practical examples.

Example 1

As the raw material for the substrate layer A of the film of the present invention, there was used 100 wt % polyethylene terephthalate (melting point 256° C., intrinsic viscosity 0.64 dl/g, in the form of pellets which had been melt blended so as to contain 0.05 wt % of wet-method silica particles of average particle size 1.2 μm); as the polymer B, there was used a 70/30 mixture of polyethylene terephthalate (melting point 256° C., intrinsic viscosity 0.64 dl/g) containing 0.05 wt % wet-method silica particles of average particle size 1.2 μm, and aromatic polyamide {MXD nylon 6007 produced by the Mitsubishi Gas Chemical Co., glass transition temperature 85° C., melting point 237° C., relative viscosity ($\eta_r$) 2.6}; and as polyamide C there was used aromatic polyamide {MXD nylon 6007 produced by the Mitsubishi Gas Chemical Co., glass transition temperature 85° C., melting point 237° C., relative viscosity ($\eta_r$) 2.6} containing 0.03 wt % of wet-method silica particles of average particle size 1.2 μm. After thoroughly vacuum drying the respective pellets, they were supplied to separate extruders, melted at 280° C. and then filtered, and the filtered melts led to a slit-shaped three-layer die, to form superimposed layers in the order substrate A layer/polymer B layer/polyamide C layer. By winding onto a cooling drum of surface temperature 25° C., cooling and solidification were carried out. In order to enhance the close adhesion between the cooling drum surface and the sheet during this time, a wire electrode was arranged on the sheet side and a DC voltage of 6 kV applied. The cast film obtained in this way was heated to 105° C. and drawn in the lengthwise direction by a factor of 3.1, to produce uniaxially-drawn film. This film was held by clips, and led into a stenter heated to 100° C., where it was continuously drawn widthwise by a factor of 4.0 in a zone heated to 110° C., after which it was heat-treated for 5 seconds in an atmosphere at 238° C., and film for vapour-deposition having a film thickness of 12 μm (substrate layer A/polymer B/polyamide C layer thicknesses=10/1/1 μm) was obtained.

Example 2

As the raw material for the substrate layer A of the film of the present invention, there was used 100 wt % polyethylene terephthalate (melting point 270° C., intrinsic viscosity 0.69 dl/g, in the form of pellets which had been melt blended so as to contain 0.05 wt % of calcium carbonate particles of average particle size 0.8 μm); as the polymer B there was used a 50/50 mixture of polyethylene terephthalate (melting point 256° C., intrinsic viscosity 0.64 dl/g) containing 0.05 wt % calcium, carbonate particles of average particle size 0.8 μm and aliphatic polyamide {melting point 225° C., intrinsic viscosity 0.64 dl/g}; and as polyamide C there was used the MDX nylon of Example 1 containing 0.03 wt % of calcium carbonate particles of average particle size 0.8 μm. After thoroughly vacuum drying the respective pellets, they were supplied to separate extruders and melted at 290° C., then filtered and the filtered melts led to a slit-shaped three-layer die, to form superimposed layers in the order substrate A layer/polymer B layer/polyamide C layer. By winding onto a cooling drum of surface temperature 25° C., cooling and solidification were carried out. In order to enhance the close adhesion between the cooling drum surface and the sheet during this period, a wire electrode was arranged on the sheet side and a DC voltage of 6 kV applied. The undrawn film obtained in this way was heated to 135° C. and drawn in the lengthwise direction by a factor of 3.1, to produce uniaxially-drawn film. This film was then held by clips, and led into a stenter heated to 100° C., where it was continuously drawn widthwise by a factor of 4.0 in a zone heated to 140° C., and then heat-treated for 5 seconds in an atmosphere at 238° C. Film for vapour-deposition having a film thickness of 12 μm (substrate layer A/polymer B/polyamide C layer thicknesses=10/1/1 μm) was obtained.

Examples 3 to 5, Comparative Examples 1 to 4

Films for vapour-deposition of average thickness 12 μm, together with vapour-deposited films, were obtained by varying the production conditions shown in Example 1 using the substrate layer A composition, the polymer B composition, the polyamide C composition, the level of added particles and the lamination ratios shown in Table 1.

Example 6

Film for vapour-deposition, having a film thickness of 12 μm (polyester A/polymer B/polyamide C layer thicknesses 10/1/1 μm) were obtained in the same way as in Example 1, except that, instead of the MXD nylon employed as the aromatic polyamide in Example 1, there was used a polyamide obtained by the polycondensation of 1,3-bis (aminomethyl)cyclohexane as the diamine and adipic acid as the dicarboxylic acid {glass transition temperature 106° C., melting point 231° C., relative viscosity ($\eta_r$) 3.1}.

Film Vapour-Deposition (Examples 1 to 6, Comparative Examples 1 to 4)

Via a rubber roll heated to 50° C., the polyamide C layer surface of the film for vapour-deposition obtained in Example 1 was subjected to a corona discharge treatment in a mixed gas atmosphere of nitrogen/carbon dioxide gas (nitrogen/carbon dioxide gas=85/15) under treatment conditions of 40 W·min/m$^2$ and, with the surface wetting tension of the film made at least 45 mN/m, the film was wound-up in the form of a roll. The film temperature at this time was 30° C. and, after leaving for 10 hours, it was slit to a narrow width. Next, the film which had been slit to a narrow width was set in a vacuum deposition device equipped with a film travel means, and after applying a high vacuum of 1.00×10$^{-2}$ Pa, the film was made to travel via a cooling metal drum at −20° C. At this time, while aluminium metal was heated and caused to evaporate, oxygen was supplied to the vapour region and the aluminium oxidized, and while so-doing condensation and deposition were performed on the corona-discharge treated face of the travelling film, forming a thin vapour-deposited film layer of aluminium oxide, and then the film wound up. After the vapour-deposition, the interior of the vacuum deposition device was returned to normal pressure and the wound film re-wound, allowed to age for 2 days at a temperature of 40° C. and vapour-deposited film obtained. The thickness of the inorganic thin film on this vapour-deposited film was 45 nm and the light transmittance was 78%. As to Examples 2–6 and Comparative Examples 1–4, vapour-deposited films with an inorganic thin film of thickness 45 nm were obtained in the same way.

The quality evaluation results for the aforesaid films used for vapour-deposition and of the vapour-deposited films are shown in Table 1.

As is clear from the results in Table 1, the films for vapour-deposition obtained in Examples 1 to 6 are outstanding in their handling characteristics and vapour-deposition adhesion, and the vapour-deposited films are outstanding in their gas barrier properties.

Furthermore, when linear polyethylene (LLD-PE) was extrusion-laminated onto the vapour-deposited face of the transparent vapour-deposited film obtained in Example 6, then the film cut to 15 cm×30 cm, and LLD-PE faces superimposed one on another, followed by three-way sealing with a heat sealer to produce a package, not only was the package transparent but it was also outstanding in its gas barrier properties in respect of oxygen and water vapour, etc.

On the other hand, the vapour-deposited films obtained in Comparative Examples 1 and 2 were films of inferior gas barrier properties. Moreover, the vapour-deposited film obtained in Comparative Example 2 had poor adhesion properties and the polyamide C layer separated away. In both cases the film was unsuitable as film for vapour-deposition.

Industrial Application Potential

With regard to the film for vapour-deposition obtained in the present invention, by providing a 0.01 to 5 μm polyamide layer (the C layer) in which the chief component is an aromatic polyamide of glass transition temperature at least 60° C. on at least one face of a substrate layer (the A layer) selected from polyester film and aliphatic polyamide film, it is possible to offer film for vapour-deposition which is outstanding in its vapour-deposition processability and gas barrier properties.

TABLE 1

| | Polyester A Composition | | | | Polymer B Composition | | | | |
|---|---|---|---|---|---|---|---|---|---|
| | | Particles | | | | | Particles | | |
| | Type | Type | Particle Size (μm) | Amount Added (wt %) | Type | SP value | Type | Particle Size (μm) | Amount Added (wt %) |
| Example 1 | PET | wet-method silica | 1.2 | 0.05 | PET//MX nylon = 50//50 | 11.5 | wet-method silica | 1.2 | 0.05 |
| Example 2 | PEN | Calcium carbonate | 0.8 | 0.05 | PEN//N-6 = 50//50 | | calcium carbonate | 0.8 | 0.05 |
| Example 3 | N-6 | calcium carbonate | 0.8 | 0.15 | — | | — | — | — |
| Example 4 | PET | colloidal silica | 0.2 | 0.20 | PET//MX nylon = 90//10 | 11.4 | colloidal silica | 0.2 | 0.20 |
| Example 5 | PEN | wet-method silica | 1.2 | 0.05 | PET//N-6 = 30//70 | 11.2 | wet-method silica | 1.2 | 0.05 |
| Example 6 | PET | wet-method silica | 1.2 | 0.05 | PET//1,3BAC nylon = 70//30 | 11.3 | wet-method silica | 1.2 | 0.05 |
| Comparative Example 1 | PET | colloidal silica | 0.1 | 0.09 | — | — | — | — | — |
| Comparative Example 2 | PET | wet-method silica | 1.2 | 0.11 | — | — | — | — | — |
| Comparative Example 3 | PET | wet-method silica | 1.8 | 0.05 | PET//MX nylon = 50//50 | 11.5 | wet-method silica | 1.8 | 0.10 |
| Comparative Example 4 | PET | wet-method silica | 1.2 | 0.01 | PET//MX nylon = 50//50 | 11.5 | wet-method silica | 1.2 | 0.01 |

Abbreviations:
PET: polyethylene terephthalate
PEN: polyethylene naphthalate
N-6: aliphatic polyamide (nylon 6)
MX nylon: aromatic polyamide (MXD nylon)
1,3BAC nylon: aromatic polyamide (polyamide obtained by polycondensation of 1,3-bisaminomethylcyclohexane and adipic acid)
$f_n$: planar orientation coefficient
Ra: surface roughness (upper figures = face which is to undergo vapour deposition, lower figures = non-vapour-deposited face)
MD: machine direction
TD: transverse direction
$H_2O$ TR: water vapour transmission (units: g/m$^2$ · day)
$O_2$ TR: oxygen transmission (units: ml/m$^2$ · day · MPa)

| Polyamide C Composition | | | | | | Film Properties | | | Vapour-Deposited Film Properties | | | |
|---|---|---|---|---|---|---|---|---|---|---|---|---|
| | | Particles | | | | | | | | | | |
| Type | Tg (° C.) | Type | Particle Size (μm) | Amount Added (wt %) | A/B/C Layer Thickness (μm) | Ra (μm) | $f_n$ | Heat Shrinkage MD/TD (%) | $H_2O$ TR | $O_2$ TR | Vapour-Deposited Film Adhesion | Handling |
| MX nylon | 85 | wet-method silica | 1.2 | 0.03 | 10/1/1 | 0.010 0.019 | 0.1660 | 1.5/−0.4 | 0.2 | 3.0 | ○ | ○ |
| MX nylon | 85 | calcium carbonate | 0.8 | 0.03 | 9/1/2 | 0.006 0.012 | 0.1692 | 1.8/−0.2 | 0.2 | 4.1 | ○ | ○ |
| MX nylon | 85 | calcium carbonate | 0.8 | 0.08 | 11/—/1 | 0.009 0.018 | 0.1684 | 2.0/−0.4 | 0.2 | 3.1 | ○ | Δ |
| MX nylon | 85 | colloidal silica | 0.2 | 0.10 | 6/1/5 | 0.005 0.010 | 0.1655 | 1.8/−0.3 | 0.2 | 3.2 | ○ | ○ |
| MX nylon | 85 | wet-method silica | 1.2 | 0.03 | 10/1/1 | 0.010 0.019 | 0.1721 | 1.6/−0.3 | 0.2 | 3.3 | ○ | ○ |
| 1,3BAC nylon | 106 | wet-method silica | 1.2 | 0.03 | 10/1/1 | 0.009 0.018 | 0.1675 | 2.3/0.1 | 0.2 | 2.0 | ○ | ○ |
| PET | 80 | colloidal silica | 0.1 | 0.04 | 11/—/1 | 0.003 0.007 | 0.1654 | 2.8/0.2 | 1.0 | 10.0 | ○ | ○ |
| N-6 | 46 | wet-method silica | 1.2 | 0.05 | 11/—/1 | 0.015 0.034 | 0.1841 | 1.8/−0.2 | 5.1 | 22.0 | × | Δ |
| MX nylon | 85 | wet-method silica | 1.8 | 0.20 | 10/1/1 | 0.04 0.035 | 0.1660 | 1.5/−0.4 | 5.5 | 15.8 | × | ○ |
| MX nylon | 85 | wet-method silica | 1.2 | 0.03 | 10/1/1 | 0.003 0.008 | 0.1660 | 1.5/−0.4 | 1.0 | 8.3 | ○ | × |

The SP value was determined from the polymer molecular structure and the specific gravity, with reference to Hoy KL, J. Paint Technol. 42 (514) 76-(1970) and Small PA, J. Appl. Chem. 3, 71-(1953)
PET: specific gravity = 1.34, SP value = 11.4
N-6: specific gravity = 1.13, SP value = 11.0
MXD nylon: specific gravity = 1.22, SP value = 11.7
1,3BAC nylon: specific gravity = 1.15, SP value = 11.2

What is claimed is:

1. A laminate film where a polyester film or an aliphatic polyamide film is employed as a substrate layer (the A layer), and where a polyamide layer (the C layer) in which the chief component is an aromatic polyamide of glass transition temperature at least 60° C is employed as a surface layer to undergo vapour deposition, and the centre-line average roughness (Ra) of the face which is to undergo vapour deposition is in the range 0.005 to 0.03 μm.

2. A laminate film where a polyester film is employed as a substrate layer (the A layer), and where a polyamide layer (the C layer) in which the chief component is an aromatic polyamide of glass transition temperature at least 60° C. is employed as a surface layer to undergo vapour deposition, and between the A layer and the C layer there is interposed a layer (the B layer) comprising polymer of SP value 10 to 15.

3. A laminate film according to claim 2 where the SP value of the B layer component is a value between the SP value of the A layer component and the SP value of the C layer component.

4. A laminate film according to claim 3 where the polymer layer (the B layer) has as its chief components polyester and polyamide.

5. A laminate film according to claim 2 where the B layer component is a mixed component of A layer component and C layer component.

6. A laminate film according to claim 1 where the centre-line average roughness (Ra) of the face which is to undergo vapour deposition is in the range 0.008 to 0.025 μm.

7. A laminate film according to claim 6 where the centre-line average roughness (Ra) of the face which is to undergo vapour deposition is in the range 0.01 to 0.02 μm.

8. A laminate film according to claim 1 where the face which is to undergo vapour deposition is subject to a corona discharge treatment.

9. A laminate film according to claim 1 where the A layer is polyester film.

10. A laminate film according to claim 1 where the planar coefficient of orientation of the A layer lies in the range 0.155 to 0.180.

11. A laminate film according to claim 10 where the planar coefficient of orientation of the A layer lies in the range 0.1625 to 0.175.

12. A laminate film according to claim 1 where the percentage heat shrinkage of the A layer at 150° C. for 30 minutes is from 0.5 to 2% in the film longitudinal direction and in the range from −1.2 to 0.5% in the widthwise direction.

13. A vapour-deposited film formed by vapour deposition of an inorganic thin film on the vapour-deposition face of the laminate film according to claim 1.

14. A vapour-deposited film according to claim 13 which is characterized in that it is used in packaging applications.

15. A laminate film according to claim 2 where the face which is to undergo vapour deposition is subject to a corona discharge treatment.

16. A laminate film according to claim 2 where the A layer is polyester film.

17. A laminate film according to claim 2 where the planar coefficient of orientation of the A layer lies in the range 0.155 to 0.180.

18. A laminate film according to claim 17 where the planar coefficient of orientation of the A layer lies in the range 0.1625 to 0.175.

19. A laminate film according to claim 2 where the percentage heat shrinkage of the A layer at 150° C. for 30 minutes is from 0.5 to 2% in the film longitudinal direction and in the range from −1.2 to 0.5% in the widthwise direction.

20. A vapour-deposited film formed by vapour deposition of an inorganic thin film on the vapour-deposition face of the laminate film according to claim 2.

21. A vapour-deposited film according to claim 20, which is characterized in that it is used in packaging applications.

* * * * *